United States Patent
Gopalan et al.

(10) Patent No.: US 9,663,641 B2
(45) Date of Patent: May 30, 2017

(54) METHOD OF FORMULATING LOW GRAVITY SPONGE RUBBER FOR AUTOMOTIVE WEATHERSTRIPS

(75) Inventors: Krishnamachari Gopalan, Troy, MI (US); Robert Lenhart, Fort Wayne, IN (US)

(73) Assignee: COOPER-STANDARD AUTOMOTIVE INC., Novi, MI (US)

( * ) Notice: Subject to any disclaimer, the term of this patent is extended or adjusted under 35 U.S.C. 154(b) by 73 days.

(21) Appl. No.: 13/700,497

(22) PCT Filed: Jun. 1, 2011

(86) PCT No.: PCT/US2011/038708
§ 371 (c)(1),
(2), (4) Date: Nov. 28, 2012

(87) PCT Pub. No.: WO2011/153203
PCT Pub. Date: Dec. 8, 2011

(65) Prior Publication Data
US 2013/0072584 A1    Mar. 21, 2013

Related U.S. Application Data

(60) Provisional application No. 61/351,212, filed on Jun. 3, 2010.

(51) Int. Cl.
*C08L 21/00*    (2006.01)
*B60J 10/16*    (2016.01)
(Continued)

(52) U.S. Cl.
CPC ............... *C08L 21/00* (2013.01); *B60J 10/16* (2016.02); *B60J 10/36* (2016.02); *E06B 7/2314* (2013.01);
(Continued)

(58) Field of Classification Search
CPC ......... C08L 21/00; B08J 10/0005; C08J 9/12; C08J 2203/22
See application file for complete search history.

(56) References Cited

U.S. PATENT DOCUMENTS 5,411,785 A * 5/1995 Cook ............................ 428/122
7,318,613 B2   1/2008 Hiroe et al.
(Continued)

FOREIGN PATENT DOCUMENTS

| JP | 08-012797 | 1/1996 |
|---|---|---|
| JP | 2003-268149 | 9/2003 |
| JP | 2007-169527 | 7/2007 |

OTHER PUBLICATIONS

PCT/US2011/028708 International Search Report and Written Opinion.
Japanese Search Report (in Japanese).

*Primary Examiner* — Hai Vo
(74) *Attorney, Agent, or Firm* — Fay Sharpe LLP

(57) ABSTRACT

The invention relates to automotive weatherstrip material. More specifically, the invention utilizes thermo-expandable microspheres in the sponge bulb member of the weatherstrip to produce a microcellular structure which provides a lower weight weatherstrip material with improved surface appearance and comparable stiffness to known materials for use in the automotive industry, and exhibiting a blown specific gravity of less than about 0.60 g/cc.

16 Claims, 12 Drawing Sheets

(51) Int. Cl.
*B60J 10/36* (2016.01)
*E06B 7/23* (2006.01)

(52) U.S. Cl.
CPC ............... *Y10T 428/249986* (2015.04); *Y10T 428/249987* (2015.04); *Y10T 428/249991* (2015.04)

(56) References Cited

U.S. PATENT DOCUMENTS

2002/0177659 A1* 11/2002 Morikawa et al. ............. 525/88
2003/0027880 A1* 2/2003 Tasaka et al. ................... 521/82
2004/0266899 A1 12/2004 Muenz et al.
2006/0258793 A1 11/2006 Nonaka et al.
2007/0084127 A1 4/2007 Muraoka et al.
2007/0254971 A1* 11/2007 De Vogel et al. ............. 521/59

* cited by examiner

METHOD OF FORMULATING LOW GRAVITY SPONGE RUBBER FOR AUTOMOTIVE WEATHERSTRIPS

BACKGROUND OF THE DISCLOSURE

The invention relates to automotive weatherstrip material. More specifically, the invention utilizes thermo-expandable microspheres to produce a microcellular structure that provides a lower weight weatherstrip material with improved surface appearance and comparable stiffness to known higher weight materials for use in the automotive industry.

Automotive weatherstrip material is generally used to create a seal between adjoining surfaces of an automobile. The seal functions to prevent environmental factors, such air, dirt, and water, from passing into a sealed portion or area of a vehicle. For example, a weatherstrip may be used to create body seals, trunk lid seals, door-to-door seals, door-to-frame seals, rocker seals, and hood seals, among others.

The automotive industry continually strives to reduce the weight of automobiles and other vehicles. This is due in part to the fact that weight affects fuel consumption which is regulated by government standards aimed at achieving reductions in fuel consumption, and thus the reduction of potentially harmful emissions. With this and other factors in mind, makers of weatherstrip materials continually work to improve their product. One effort focuses on reducing the weight of the weatherstrip material. Weight reduction, however, must be balanced with the need to preserve properties such as surface quality and stiffness, which can suffer as the weight is reduced, and particularly as the blown specific gravity, which corresponds to weight, of sponge rubber compounds approaches or drops below about 0.60 g/cc. Of particular interest herein is the desire to find new and alternative weather strip materials that provide lighter weight options, while not sacrificing the hardness, stiffness, and other desirable performance parameters of existing weatherstrip materials.

In general, automotive weatherstrips comprise a main body member and a bulb member. The main body member is that portion of the weatherstrip that is secured to at least one of a pair of abutting or adjoining surfaces. Therefore, the main body member is generally comprised of a hard, stiff material, such as a dense rubber, that resists degradation due to heat, moisture, and other environmental conditions. The bulb member is that portion of the weatherstrip that generally extends from the base member and is received in or is compressed by the second abutting or adjoining surface, i.e., it is received between two abutting and adjoining surfaces, creating a seal. Due to its function and physical position between adjoining surfaces or parts of the vehicle, the bulb member is generally comprised of a sponge-like, less dense and more resilient rubber material.

In one effort to achieve reduced weight of the overall weatherstrip, the dense rubber base portion of the weatherstrip has been formulated using blowing agents. In this regard, U.S. Pub, App. No. 2007/0084127 A1 provides an automobile weatherstrip comprising a fitting base and a bulb shape, where the fitting base is formed of dense rubber with porosity containing air bubbles obtained by mixing thermal expansion microcapsules with the dense rubber, followed by vulcanization of the mixture. This application teaches that it is important to retain the microcapsule shells intact, avoiding rupture of the same, in order to diminish the deleterious effects caused by the presence of open pores that create a rough and/or blistered surface. Use of the microcapsules is reported to reduce the specific gravity of the fitting base material from approximately 1.1 g/cc to a blown specific gravity of about 1.0 g/cc.

While the foregoing does reduce weatherstrip weight to some degree, there remains a need to reduce the weight even further. In this regard, the invention disclosed, in one embodiment, focuses on using thermo-expandable microspheres in the sponge bulb member composition or active section of an automotive weatherstrip, as opposed to the dense rubber base member or section. Manufacturers generally use chemical blowing agents in the formulation of sponge weatherstrip materials to form porosity and lower the specific gravity of sponge automotive weatherstrips. Such blowing agents include, for example, p,p'-oxybis(benzenesulphonylhydrazide)(OBSH), and/or azodicarbonamide (AZ), and other similar chemical blowing agents. The use of such materials lowers the blown specific gravity. However, properties such as surface quality and stiffness generally suffer once the blown specific gravity of the sponge bulb material compounds used in the weatherstrip formulations approach 0.60 g/cc or below. Therefore, there is a need in the automotive industry to reduce the weight of the weatherstrip by reducing the blown specific gravity of the sponge bulb member material without sacrificing hardness, stiffness or other desirable performance parameters met by known, heavier weatherstrip materials, and while yet providing a smooth and aesthetically pleasing outer surface.

It would, therefore, be advantageous to have a weatherstrip material including a sponge bulb member exhibiting a blown specific gravity of below 0.6 g/cc in conjunction with hardness and stiffness comparable to heavier materials and yet having a smooth, aesthetically pleasing appearance.

SUMMARY OF THE DISCLOSURE

The use of a physical blowing agent as a component of the elastomeric or rubber material used to form the sponge bulb member of a weatherstrip provides for reduced weight of the sponge bulb member material, measured as reduced blown specific gravity, improved surface appearance, and comparable stiffness to heavier prior art materials. More specifically, the use of thermo-expandable microspheres in the material used to form the sponge bulb member of the weatherstrip provides a reduction in blown specific gravity to about 0.60 g/cc or lower without a correlating loss in hardness, stiffness, or other performance parameters, and with improved surface quality.

In one embodiment, the automotive weatherstrip provided comprises a main body member and a sponge bulb member wherein the sponge bulb member comprises an elastomeric or rubber material exhibiting a blown specific gravity of less than about 0.60 g/cc and an inner pore structure wherein the pores have a diameter of less than about 110 μm.

Still other features and benefits of the present disclosure will become apparent upon reading and understanding the following detailed description.

DETAILED DESCRIPTION OF THE PREFERRED EMBODIMENTS

Figure 1:
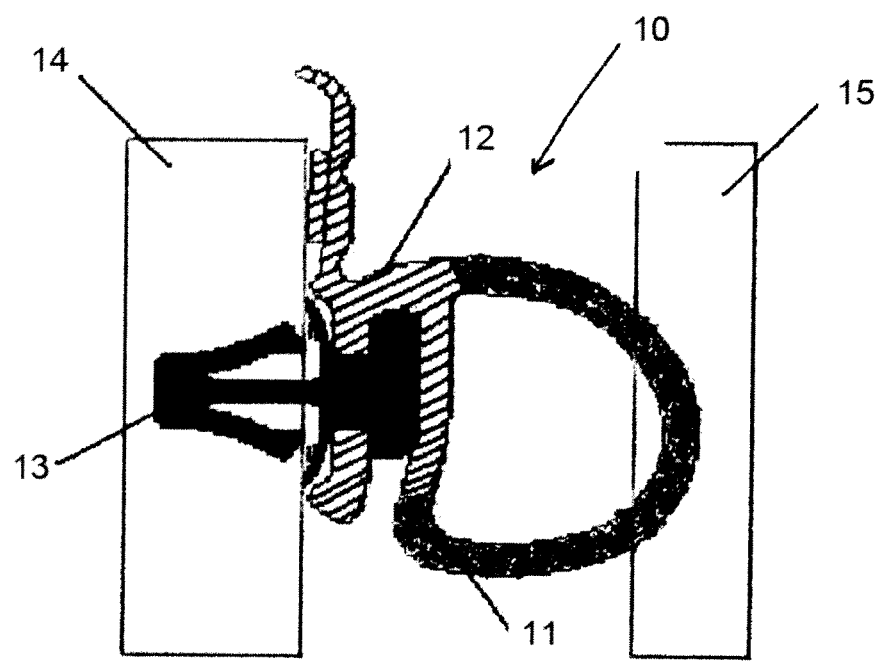
FIG. 1 is a cross-section of an embodiment of the automotive weatherstrip according to the present invention.

The invention is directed to an automotive weatherstrip material including a dense rubber base member and a contiguous sponge-like bulb member exhibiting a blown specific gravity of less than about 0.60 g/cc and a unique microcellular structure. With specific reference to FIG. 1, there is shown a cross-sectional representation of an automotive weatherstrip 10 comprising a dense or micro-dense main body member 12 and a contiguous sponge bulb member 11. The main body member 12 is secured to the vehicle body 14 by any conventional means for doing so, including but not limited to for example, retainer pin 13, though this is not a limiting feature of the invention. As such, any means known in the relevant art for securing the weatherstrip to a vehicle surface may be used. Sponge bulb member 11 provides a seal when the weatherstrip is brought into resilient contact with door panel 15. As will be appreciated by one familiar with the field of endeavor, the vehicle body represented by 14 and the door panel represented by 15 may be any two adjoining surfaces that would benefit from the presence of a seal impervious to environmental conditions, such as the seal provided by the weatherstrip in accord with the invention. As such, body 14 and door 15 are merely representative of adjoining surfaces and are not considered to be limiting features of the invention. Other locations for such seals include for example door panels, body seals, trunk lid seals, door-to-door seals, rocker seals, and hood seals.

Main body member 12 of the weatherstrip generally comprises a hard, dense rubber and may be comprised of any conventional material used for such purposes, including elastomeric rubbers, as well as thermoplastic vulcanizates (TPV) and other elastomeric polymers. Suitable elastomeric rubber compositions for use in the main body member include, but are not limited to, ethylene-alpha-olefin-non-conjugated diene rubber (EODM), styrenebutadiene rubber (SBR), acrylonitrilebutadiene rubber, natural or synthetic isoprene rubber, and chloroprene rubber. EODM rubbers are preferred due to their oxygen, ozone, and weather resistance. Suitable alpha-olefins include, but are not limited to, propylene, 1-butene, 1-pentene, 1-hexene, 1-octene, and 1-decene. A preferred alpha-olefin is propylene. A preferred group of EODM compounds suitable for the present invention are ethylene propylene diene terpolymers (EPDM). Suitable non-conjugated dienes include, but are not limited to, 1,4-hexadiene, dicyclopentadiene, and 5-ethylidene-2-norbornene. A preferred EODM for the main body member of the weatherstrip of the present invention is ethylene propylene ethylidene norbornene terpolymer or ethylene propylene di-cyclo pentadiene terpolymer. Various grades of elastomer thermo-set rubbers may be used in the invention, including dense elastomers and those that are less dense. Of these, thermoset elastomeric rubber materials, such as ethylene-propylene-diene terpolymer (EPDM), styrene-butadiene copolymer (SBR) and chloroprene rubber are favored by manufacturers because they are relatively inexpensive compared to thermoplastics and generally exhibit both the desired flexibility necessary for providing an effective seal and acceptable weatherability properties.

Thermoplastic vulcanizates (TPVs) may also be employed. These compounds are generally characterized as having polyolefinic matrices, preferably crystalline, through which thermo-set elastomers are generally uniformly distributed. Any conventional TPV having the desired weatherability, flexibility, and strength may be used. Examples of TPVs include ethylene-propylene rubber (EPR) and ethylene-propylene-diene rubber (EPDM) thermo-set materials distributed in a crystalline polypropylene matrix. A typical TPV is a melt blend or a reactor blend of a polyolefin plastic, typically a propylene polymer, with a cross-linked olefin copolymer elastomer (OCE), typically an EPM or an EPDM. In those TPVs made from EPDM, the diene monomer utilized in forming the EPDM terpolymer is preferably a non-conjugated diene. Illustrative examples of non-conjugated dienes which may be employed are dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-butylidene-2-norbornene, and the like.

The elastomer of the main body member can further include various additives known in the art. Such additives include, but are not limited to, vulcanization agents, carbon black, lubricants, plasticizers, fillers, slip agents, processing oils, and antioxidants. These additives are generally added to the polymer prior to formation of the main body member.

In one embodiment, automotive weatherstrip 10 includes a dense rubber base member 12 integrally formed with contiguous sponge bulb member 11 which exhibits a blown specific gravity of less than about 0.60 g/cc. In another embodiment, automotive weatherstrip 10 includes a dense rubber base member 12 integrally formed with contiguous sponge bulb member 11 which exhibits a substantially uniform microcellular structure wherein the open pores exhibit an average diameter of less than about 110 micrometers. This unique pore structure, having pores less than about half the size of pores formed using chemical blowing agents, results from the use of at least one physical blowing agent, particularly thermo-expandable microspheres, in the formulation of the sponge bulb member of the automotive weatherstrip.

The elastomeric or rubber material used to formulate the base member and the sponge bulb member may be the same or different elastomeric material. Generally, the bulb member is formed from an elastomeric material, and is rendered less dense, and more sponge-like, by the addition of one or more blowing agents. By "less dense" it is meant that the sponge bulb member 11 exhibits a blown specific gravity below that of the base member 12. For example, the base member and the sponge bulb member elastomeric material may exhibit similar densities prior to cure, typically around 1.1-1.2 g/cc. Upon cure at an appropriate temperature for the specific elastomer or rubber material used, the density may be reduced. In accord with at least one embodiment hereof, the sponge bulb member material density is further reduced by the addition to the rubber or elastomeric material of a physical blowing agent such that the sponge bulb member exhibits a blown specific gravity of less than about 0.6 g/cc.

One skilled in the art will understand that, in general, the preparation of a weatherstrip involves the formulation of a rubber material composition for use in making the base member and a second composition intended for use in making the sponge bulb member. For purposes of this disclosure, only the composition used to make the sponge bulb member is focused on. Further, this invention focuses specifically on the addition of particular blowing agents to the sponge rubber composition used to make the sponge bulb member. Therefore, as used herein, the term "sponge rubber composition" refers to the elastomeric or rubber based composition prior to the addition of any blowing agents and accompanying additives, such as accelerators or activators. Similarly, the term "finish batch" is used herein to refer to the sponge rubber composition having the blowing agents and any accompanying additives added thereto. As such, the finish batch is that material that is extruded to create the sponge bulb member 11.

As noted above, sponge bulb member 11 of the automotive weatherstrip according to one embodiment of the invention compresses between adjoining surfaces to create a tight seal that is impervious to environmental factors. Because the sponge bulb member must be capable of resiliently compressing, it is known to use a less dense, less stiff rubber for this portion of the automotive weatherstrip. For example, the sponge bulb member may be formed of an EPDM material that is softer than the vulcanized EPDM used to form the base member, and which has increased elastic deformation properties as compared to the dense base member material. Other potentially suitable sponge rubber polymers include, for example, thermoplastic vulcanizates (TPV). The sponge rubber composition used to create sponge bulb member 11 may include additives as are known in the art to enhance certain performance parameters, such as hardness, elasticity, stiffness, resilience, and others, depending on the location or part of the vehicle for which the weatherstrip is intended.

The sponge rubber composition may further become the finish batch by the addition thereto of blowing agents, accelerators, and activators, which are combined with the sponge rubber composition to affect certain end product properties. In one embodiment, the additives may be added to a commercially available sponge rubber composition. In another embodiment, the sponge rubber composition is prepared and the blowing agent(s) and accompanying additives are added during formulation thereof. In still another embodiment, the sponge rubber composition is prepared and the blowing agent(s) and accompanying additives are added in a separate step after formulation thereof. In any of the foregoing embodiments, conventional blowing agents generally used to lower the density of the sponge bulb member are replaced either completely or in part by at least one physical blowing agent, specifically by thermo-expandable microspheres. The thermo-expandable microspheres are considered to be "physical" blowing agents, i.e., they undergo a strictly physical reaction to the application of heat or another change in condition or processing parameters. This differs from more commonly used "chemical" blowing agents, which undergo chemical reaction with a portion or all of the base rubber material.

The thermo-expandable microspheres suitable for use herein include microspheres having an average particle diameter of about 5 µm to about 50 µm, preferably from about 8 µm to about 16 µm. The choice of thermo-expandable microsphere to be used depends on the sponge rubber composition it is to be added to or combined with. For example, the microspheres must expand and rupture at or below the temperature at which the finish batch will be processed and extruded to form the sponge bulb member of the weatherstrip. It is noted herein that the base member and the sponge bulb member may be co-extruded or extruded separately and then permanently affixed. In one embodiment, microspheres suitable for use herein are formulated with an acrylonitrile shell and a lower molecular weight hydrocarbon fill or expandable medium, though other microsphere formulations may be used without departing from the intent of the invention. The expansion temperature of the thermo-expandable microspheres is generally categorized or rated on the basis of the temperature at which volatilization of the expandable medium is initiated, i.e. $T_{start}$, and the temperature at which the maximum expansion is reached, i.e. $T_{max}$. In one embodiment, $T_{start}$ may be between about 80° C. and 100° C., and $T_{max}$ may range from about 115° C. to about 205° C. For example, Table 1 below sets forth the $T_{start}$ and $T_{max}$ for exemplary commercially available thermo-expandable microspheres, though these are only intended as representative of suitable microspheres.

TABLE 1

| Microsphere | $T_{start}$-° C. | $T_{max}$-° C. |
|---|---|---|
| MBF-46KE60[1] | 90-100 | 130-140 |
| EXPANCEL ® 031 DUX 40[2] | 80-95 | 115-135 |
| EXPANCEL ® 551 DU 40[2] | 95-100 | 139-147 |

[1]acrylonitrile copolymer/hydrocarbon microcapsule commercially available from Matsumoto Yushi-Seiyaku Co., Ltd
[2]acrylonitrile copolymer/hydrocarbon microcapsule commercially available from Eka Chemicals AB/Expancel, a Swedish entity The expansion temperature of a particular physical blowing agent or expandable microsphere is affected not only by the type of shell and fill, but also by the quantity of hydrocarbon/s or other expandable medium enclosed in the shell. The choice of hydrocarbon fill is dependent on processing parameters because as the molecular weight of the hydrocarbon increases there is a correlated increase in the temperature needed to volatilize the fill.

In one embodiment, the thermo-expandable microspheres comprise a shell/core structure, or more appropriately a balloon-like structure containing a heat-expandable medium. The shell, or balloon, may be comprised of a polymeric material that softens, expands as the hydrocarbon fill is volatilized within in response to heat, and eventually ruptures. For example, suitable microspheres may be formed having shells comprising thermoplastic resins, such as, but not limited to, polyvinylidene chloride, vinylidene chloride-acrylonitrile copolymer, polymethyl methacrylate, acrylonitrile-based copolymer, and polyvinylchloride.

The heat-expandable medium contained in the polymer shell may be any medium that volatizes at the expansion and rupture temperature of the shell such that upon rupture of the shell the volatized medium escapes as gas. Of course, due to environmental concerns, it is preferable to use a medium that is non-toxic and non-degrading with regard specifically to the sponge rubber composition and more generally to the environment. For example, the heat-expandable medium may be a hydrocarbon, and preferably a low boiling point hydrocarbon, for example, n-pentene, n-hexane, n-butane, iso-butane, iso-pentane, and other like hydrocarbons. In addition, other expandable mediums may be included, such as nitrogen, helium, air, and the like. Generally, the fill is present within the shell of an unexpanded microsphere in the liquid state. Upon exposure to heat, for example during processing, the polymer shell softens while at the same time the hydrocarbon fill volatilizes and expands. As the heat continues to increase, the volatilized fill causes the softened shell to eventually rupture, releasing the volatilized hydrocarbons, and leaving very small, hollow pores in the sponge bulb member of the automotive weatherstrip material.

Once the microspheres rupture, the sponge bulb member of the weatherstrip, in cross-section, exhibits a microcellular structure characterized by substantially spherical pores having a cross-sectional diameter of less than or equal to about 110 μm. This is much smaller than the 200 μm pore size created by traditional blowing agents. Given the smaller pore structure and more regular distribution of pores created using the thermo-expandable microsphere physical blowing agent, the resulting weatherstrip exhibits a much lighter weight, i.e. a lower blown specific gravity, accompanied by a smoother, enhanced quality surface. The sponge bulb member in accord herewith exhibits a blown specific gravity of less than about 0.60 g/cc, and preferably less than or equal to about 0.40 g/cc. Further, and unexpectedly, the sponge bulb member in accord herewith retains the performance parameters attributed to sponge bulb materials formulated using traditional, chemical blowing agents, while unexpectedly exhibiting enhanced surface quality.

In addition to the foregoing scenario employing unexpanded microspheres, it is possible to use expanded microspheres, i.e., microspheres exposed to increased temperature such that the fill has become at least partially volatilized prior to addition to the sponge rubber composition. In this scenario, the fill would likely be present in the gaseous state prior to processing.

While it has been known to use a small amount of thermo-expandable microspheres in the base member 12 of automotive weatherstrip material, wherein specific gravities of 1.10 g/cc have been achieved, it has not been known to use thermo-expandable microspheres in the sponge bulb member 11 of the automotive weatherstrip. Based on known uses of such materials, it would be expected that the addition of thermo-expandable microspheres would create a porous microcellular structure characterized by an increased number of non-uniform pores having pore diameters on the order of 200 μm, contributing to the occurrence of a rough surface with a less aesthetically pleasing appearance. More importantly, it is further generally understood within the art that as the density of the sponge rubber material decreases the performance of the material suffers as well. Given the foregoing, the use of blowing agents, and more specifically of physical blowing agents, has not been previously considered as a means to reduce the overall weight of weatherstrip material.

Figure 2:
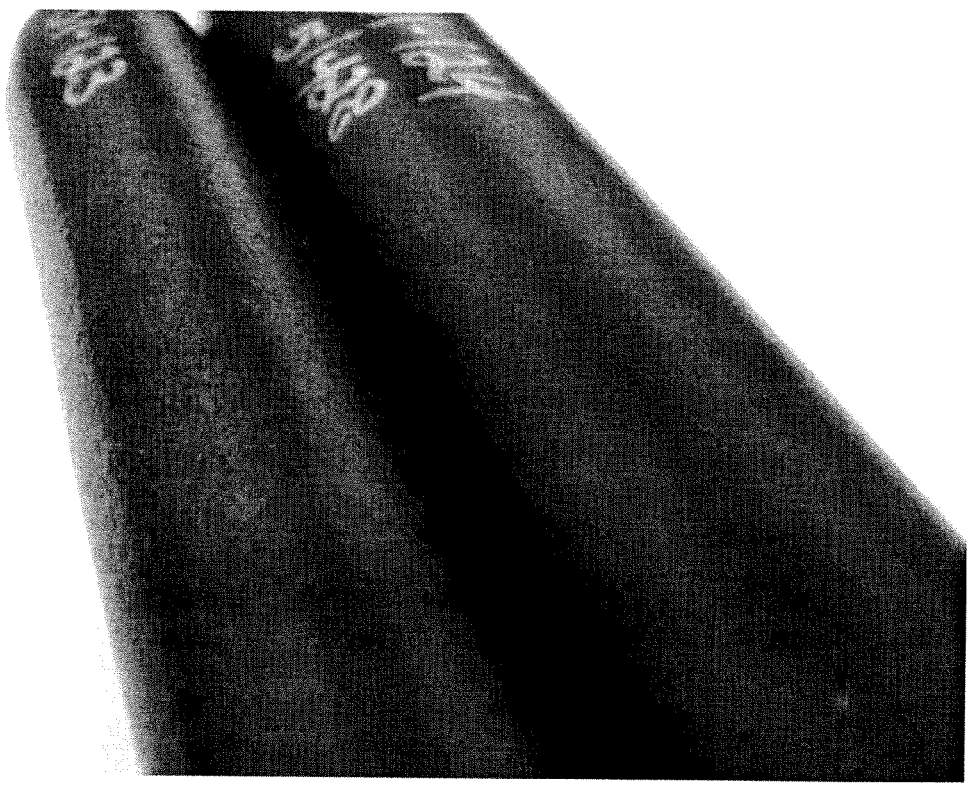
FIG. 2 is a photo showing a comparison of the surface of a prior art sponge rubber material as compared to the surface of a sponge rubber material in accord with an embodiment of the invention.

However, unexpectedly, the finished sponge bulb member created from a sponge rubber finish batch including thermally expandable microspheres as disclosed herein actually exhibits improved surface quality and improved smoothness, as opposed to the rough surface quality expected based on prior technology, without sacrificing any of the desirable performance parameters of known sponge rubber materials having higher densities. FIG. 2 provides a photo showing a side-by-side comparison of the surface quality of a sponge rubber specimen according to the prior art 21 and including only chemical blowing agents, as compared to that of a sponge rubber specimen in accord with the invention 22 and including a physical blowing agent. The foregoing is particularly unexpected based on the fact that it is known that at lower densities, it is difficult to control surface quality. Finally, the sponge bulb member in accord with the foregoing exhibits performance characteristics, i.e., stiffness, resilience and resistance to degradation due to environmental factors, in keeping with known materials having greater densities and larger pore structures characteristic of materials including chemical blowing agents.

The thermo-expandable microspheres may be included as up to 100% of the blowing agent component of the sponge bulb finish batch. However, because thermo-expandable microspheres tend to be more expensive than traditional or conventional blowing agents, it is acceptable to use the thermo-expandable microspheres in combination with one or more conventional blowing agents. For example, the total blowing agent component of the formulation may include from 100% to about 40% thermo-expandable microspheres, the remaining blowing agent component comprising one or more conventional blowing agents. It is to be understood, however, that the lower end of this range may be even lower depending on the specific performance targets or requirements for a given part, in addition to the affect of other constituents of the sponge rubber composition on the performance of the microspheres.

In the following examples, the constituent amounts are shown in parts of a constituent or component used per 100 parts (phr) rubber or elastomer polymer in the sponge rubber composition. Typically, the sponge rubber composition includes 100 parts elastomer or rubber polymer, along with levels of carbon black, oil, mineral filler, zinc oxide, and stearic acid necessary to meet the specifications or requirements of the material based on its intended use. Process aids may also be added to improve dispersion of the ingredients during mixing and to help the general processability of the predominant rubber compound. Some EPDM formulas utilize oil-extended polymers. These polymers contain a certain amount of oil "absorbed/mixed" into the polymer. In this instance, the sponge rubber composition may include more than 100 phr polymer. For example, if a polymer is extended with 15 phr oil, the sponge rubber composition would contain 115 phr of the oil extended polymer in order to get 100 phr polymer.

As has been indicated, the sponge rubber composition may be a commercially available material, to which the desired additives have already been added, or it may be prepared according to known standards and techniques as commonly used in the industry.

One or more additives may be added to the finish batch in a separate processing/mixing step, or they may be added during mixing of the sponge rubber composition. Most sponge bulb finish batch compositions have a shelf life of about 3 days. After that time, temperature and moisture can start to affect the material, and may result in it being unsuitable for use. One type of additive employed is an accelerator, which may be added to enhance the speed at which the finish batch cures once it is exposed to increased temperature during the extrusion process. Optimally, curing of the finish batch, including all additives, is not initiated until the material is extruded. As with most additives, the accelerators if used are selected based on the over-all finish batch composition, as well as the performance specifications for the resulting material. Exemplary accelerators include, but are not limited to, 2-mercaptobenzothiazole, 2-mercaptobenzothiazole disulfide, tellurium diethyldithiocarbamate, zinc dibutyldithiocarbamate, tetramethyl thiuram disulfide, and others known to those skilled in the art.

Yet another type of additive, included specifically for the purpose of reducing the blown specific gravity of the sponge bulb material, and of particular focus herein, is a blowing agent. Conventional sponge bulb finish batch compositions may include one or more chemical blowing agents, such as p,p'-oxybis(benzene sulphonylhydrazide)(OBSH), and/or azodicarbonamide (AZ), for example. In one embodiment, at least 40% of the conventional blowing agent(s) is replaced with a physical blowing agent, for example thermo-expandable microspheres of the type defined in accord with the invention. For example, suitable physical blowing agents may be of the shell/core microsphere type, having a polymer shell, for example an acrylonitrile copolymer shell, encapsulating a thermo-expandable fill, for example a hydrocarbon, nitrogen, helium, argon, air, or other heat-expandable medium.

Another type of additive that may be used is an activator, used to activate the blowing agent. As with most additives, the activator if used is selected based on the over-all finish batch composition, as well as the performance specifications for the resulting material and more specifically on the blowing agent(s) used. Exemplary activators include, but are not limited to ethylenethiourea. In addition to the foregoing, a desiccant may be added if necessary, as well as a cross-linking agent.

The following Table 2 sets forth various types of additives in accord with the foregoing and the Upper Solubility Limit (USL) of each, based on addition to 100 phr sponge rubber composition. The upper solubility limit represents the maximum amount that may be added to avoid the presence of residual additive that, if present, may deleteriously affect performance of the material. Of course, one skilled in the art will know and understand that the limits set forth may be extended depending on the exact chemical composition of the additive and its relationship and interaction with the remaining components in the sponge rubber composition. While accelerators and activator are shown, blowing agent upper solubility limits are not provided as the amount of this component added is dictated by the target blown specific gravity for the material/part to be made, and the existing specific gravity of the particular sponge rubber composition being used. Even so, it has been established herein that replacing at least about 40% of the total blowing agent component(s) with a physical blowing agent, such as thermo-expandable microspheres, results in achieving a blown specific gravity of less than 0.6 g/cc, and even less than 0.4 g/cc, while retaining the desirable performance parameters of the sponge rubber finish batch, and also achieving enhanced surface quality, all as compared to the same type of sponge rubber finish batch without the benefit of a physical blowing agent such as thermo-expandable microspheres.

TABLE 2

| ADDITIVE TYPE/ADDITIVE | USL (phr) |
|---|---|
| Accel/2-mercaptobenzothiazole | 3.0 |
| Accel/2-mercaptobenzothiazole disulfide | 3.0 |
| Cross-linking Agent/Sulfur | 3.0 |
| Accel/tellurium diethyldithiocarbamate | 0.4 |
| Accel/zinc dibutyldithiocarbamate | 2.0 |
| Accel/tatremethyl thiuram disulfide | 0.7 |
| Accel/dipentamethylene thiuram disulfide | 0.8 |
| Activator/ethylenethiourea | 1.3 |

EXAMPLES

The following examples are provided to aid the reader in better understanding the invention disclosed herein, and are not intended to be limiting thereof, as varying parameters, constituents, and processing features differing from those exemplified, but in keeping with the full meaning of the teaching provided, will be apparent to those skilled in the art from a reading of the foregoing in conjunction with these examples.

In preparing the sponge rubber composition, a commercially available base rubber composition or sponge rubber composition may be used. Alternatively, a sponge rubber composition may be prepared as known in accordance with existing art. In either of the foregoing scenarios, the thermo-expandable microspheres and other additives may be added to the sponge rubber composition in accord with the following processing parameters. It is further understood that the additives may be mixed with the sponge rubber composition at the time of initial preparation of the same, or in a separate mixing step.

EXAMPLES. In this Example, a suitable thermoelastic polymer composition, including common additives as known to one skilled in the art, was used as the sponge rubber composition. The compositions set forth in Table 3 below represent the addition of various combinations of blowing agents, accelerators and activators to render the finish batch composition.

In each Example, the sponge rubber composition was added to a Banbury mixer and mixed for approximately 3 minutes, then dropped at approximately 290° F., milled, cooled, and allowed to sit at room temperature for 24 hours. After this time period had elapsed, the composition, now referred to in the art as the master batch, was again added to the Banbury mixer. In addition, at this time the remaining ingredients, referred to herein collectively as additives, shown in Table 3 below were added, and the combination was mixed for approximately 2 minutes, after which time it was dropped at 170° F., milled, and cooled. From these formulations, lab specimens were extruded and placed in a hot air oven at 250° C. for 5 minutes. Each specimen constituted a ribbon exhibiting a blown specific gravity as shown. In use, the resulting finish batch material would be charged to an extruder for extrusion as the sponge bulb member of an automotive weatherstrip in accord with known techniques for extruding rubber weatherstrip materials. In the alternative, the material may be stored until such time as it is needed. If the material is to be stored, temperature and moisture considerations of the storage container/facility must be taken into account as heat and the presence of moisture can cause curing to be initiated prematurely.

With reference to Formulations A and B, the following is noted. Formulation A included a combination of accelerators. The first two, 2-mercaptobenzothiazole and 2-mercaptobenzothiazole disulfide, are often paired due to the fact that the first is a faster curing agent and the second can be used to slow the cure down. The tellurium diethyldithiocarbamate accelerator is very expensive to use compared to the other accelerators, and can be used in conjunction with zinc dibutyldithiocarbamate, which is a similar accelerator but is slower acting. In comparing Formulation A with Formulation B, it is noted that Formulation B has an increased amount of 2-mercaptobenzothiazole, and no 2-mercaptobenzothiazole disulfide. Further, tellurium diethyldithiocarbamate was eliminated due to the high cost thereof, but this resulted in a slower cure time, hence the increase in amount of the faster 2-mercaptobenzothiazole (2.01 phr in B as compared to 1.22 phr in A) accelerator. With regard to the blowing agents incorporated into the formulations, A included a total of 2.88 phr chemical blowing agent, while B included 4.77 phr chemical blowing agent and 11.0 phr physical blowing agent.

Table 4 sets forth the results of testing done to verify physical parameters having bearing on the ultimate performance of the specimen with regard to use as weatherstrip material. Only Formulation A (shown in FIG. 2, 21), representative of a conventional sponge bulb member formulation which does not include a physical blowing agent, and Formulation B (shown in FIG. 2, 22), representative of a sponge bulb member formulation in accord with at least one embodiment of the invention and including thermo-expandable microspheres as a physical blowing agent additive, were tested. Formulations C, D, E, F, and G, are provided as further examples of sponge bulb formulations.

The two sponge bulb formulations, A and B, were tested to determine various characteristics. The first set of data was taken from blown sponge bulb material specimens prepared in accord with the foregoing processing parameters. The Slab Duro, Shore A measurement is a measure of hardness well known to those skilled in the art. The test was performed by pressing a blunt-end needle against the surface of the material and measuring the displacement. Due to the nature of the test, results varying within +/−2 points of each other are considered comparable. As can be seen, Formulation B exhibited a Shore A Hardness of 42, much harder than the conventional Formulation A which exhibited a Shore A Hardness of only 29. This result is highly unexpected given that the blown specific gravity of Formulation B is much lower.

The next data point represents the Tensile Strength, measured in MPa. These values are comparable at 2.0 and 1.9, proving that Formulation B in accord with an embodiment hereof suffers no loss in tensile strength.

The Elongation % data refers to the maximum percentage of increase in the elongation of the specimen up to that point where the specimen breaks. Formulation A is shown to have an increased Elongation % as compared to Formulation B.

The 100% Modulus data represents the force/unit area required to achieve a particular elongation and is a measure of the materials resistance to deformation. Formulation B shows a slightly higher modulus than A, corresponding to an increase in stiffness, which is needed to maintain compression load deflection (CLD). This increase in stiffness is also unexpected given that the material has a lower blown specific gravity.

The last data point in the first set of results, denoted "Tear C", represents a measure of the capacity of the material to resist initiation and propagation of a break in its surface. As is shown, some parts have a 2 N/mm minimum requirement, so both specimens A and B are well above the acceptable minimum.

The second set of data points provided represent results from conducting the same tests, but on samples heated to 80° C. Formulation A exhibited a significantly lower Tensile and Elongation % at the higher temperature, while Formulation B proved to remain stable and exhibit comparable performance at the higher temperature. This is yet another benefit of the use of the formulation in accord with the invention.

With regard to the blown specific gravity of the prepared material, as shown in Table 4, Formulation A exhibited an average blown specific gravity (the average of Specimen 1 and 2) of 0.532, while Formulation B exhibited an average blown specific gravity of 0.384, below the 0.4 g/cc target. Also shown is the water absorption of each formulation, which is a measure of how much water will get stored in the open pores of the material. As can be seen, Formulation B in accord with the invention absorbed considerably less water (26.81 vs. 8.63) which is highly desirable in order to retain the overall integrity of the material and keep the weight of the part as low as possible. Finally, the CLD value for each formulation is provided. This is a measure of force/area and was determined from cured, blown rubber tubes. This value, which represents the suitability of the material for use as a resilient sealing means, is generally part specific given that part geometry is a factor in determining this parameter. CLD can be a function of the ratio of blowing agents combined in a given finish batch. The test is performed by compressing the material, in this instance a tube comprising the blown finish batch material, and measuring the force per unit area, in N/mm$^2$, necessary to compress the material. In general, the goal is to maintain or exceed the required performance for a specific part. Formulation B's CLD was 0.1970, while Formulation A exhibited a CLD of 0.1478. This result shows that higher CLD can be achieved using physical blowing agent(s) even though use of the same reduces the blown specific gravity of the specimen.

The foregoing shows the advantage to be gained by formulating the elastomeric material used for the sponge bulb member portion of a weatherstrip in accord herewith. Specifically, it is shown that by including thermo-expandable microspheres in the formulation, in place of or in combination with conventional blowing agents, the blown specific gravity of the material can be reduced to at least 0.6 g/cc or below, for example to 0.4 g/cc or below.

TABLE 3

|  | Formulation A | Formulation B | Formulation C | Formulation D | Formulation E | Formulation F | Formulation G |
| --- | --- | --- | --- | --- | --- | --- | --- |
| 2-mercaptobenzothiazole[1] | 1.22 | 2.01 | 0.37 | 1.47 | 1.47 | 1.47 | 1.47 |
| 2-mercaptobenzothiazole disulfide[1] | 0.37 |  | 0.74 | 0.72 | 0.72 | 0.72 | 0.72 |
| Sulfur[2] | 1.50 | 1.80 | 1.19 | 2.00 | 2.00 | 2.00 | 2.00 |
| Tellurium diethyldithiocarbamate[1] | 0.40 |  | 0.18 |  |  |  |  |
| Zinc bis dimethyldithiocarbamate[1] |  |  | 0.59 |  |  |  |  |
| Dipentamethylenethiuram hexasulfide[1] | 1.00 | 1.23 | 0.80 | 1.23 | 1.23 | 1.23 | 1.23 |
| Ethylenethiourea[3] | 0.75 | 1.33 | 1.35 | 1.33 | 1.33 | 1.33 | 1.33 |
| Azodicarbonamide[4] | 1.15 | 4.77 | 2.34 | 8.68 | 4.34 | 4.34 | 4.34 |
| Tetramethyl thiuram disulfide[1] | 0.40 | 0.60 |  | 0.60 | 0.60 | 0.60 | 0.60 |
| Zinc dibutyldithiocarbamate[1] | 1.33 | 0.50 | 1.79 |  |  |  |  |
| p,p'-oxybis(benzene sulfonylhydrazide)[4] | 1.73 |  | 3.24 |  |  |  |  |
| Calcium oxide[6] |  |  |  | 7.20 | 7.20 | 7.20 | 7.20 |

TABLE 3-continued

|  | Formulation A | Formulation B | Formulation C | Formulation D | Formulation E | Formulation F | Formulation G |
|---|---|---|---|---|---|---|---|
| Acrylonitrile copolymer microspheres[5] |  | 11.00 |  |  | 6.70 | 6.70 | 13.30 |
| Blown Specific Gravity (g/cc) | 0.532 | 0.384 | 0.552 | 0.439 | 0.549 | 0.544 | 0.358 |

[1]accelerator;
[2]cross-linking agent;
[3]activator;
[4]chemical blowing agent;
[5]physical blowing agent;
[6]desiccant

TABLE 4

|  |  | Formulation A | Formulation B |
|---|---|---|---|
| Original Physics (5'/250 C)[7] | Slab Duro, Shore A | 29 | 42 |
|  | Tensile, MPa | 2.0 | 1.9 |
|  | Elongation % | 239 | 212 |
|  | 100% Modulus, MPa | 0.8 | 1.1 |
|  | Tear C, N/mm[8] | 8.1 | 7.5 |
| Original Physicals at 80° C. | Slab Duro, Shore A | 31 | 40 |
|  | Tensile, MPa | 1.5 | 1.9 |
|  | Elongation % | 168 | 201 |
|  | 100% Modulus, MPa | 0.8 | 1.0 |
| Blown Density | specimen 1 | 0.524 | 0.383 |
|  | specimen 2 | 0.539 | 0.384 |
|  | Average | 0.532 | 0.384 |
| % Water Absorption | specimen A | 23.25 | 8.66 |
|  | specimen B | 30.37 | 8.59 |
|  | Average | 26.81 | 8.63 |
| CLD[9]-sponge tube (5'/210° C.) - N/mm² | Specimen A | 0.1353 | 0.1833 |
|  | Specimen B | 0.1627 | 0.1957 |
|  | Specimen C | 0.1453 | 0.2120 |
|  | Avg. | 0.1478 | 0.1970 |

[7]Blown lab specimens, prepared in hot air oven for 5 minutes at 250° C., tested at ambient temperature
[8]Based on 2 Newtons/mm minimum
[9]Based on sponge rubber tubes, prepared 5 minutes at 210° C.

Figure 3:
FIG. 3 is a photo of the surface of a prior art sponge rubber material.
Figure 4:
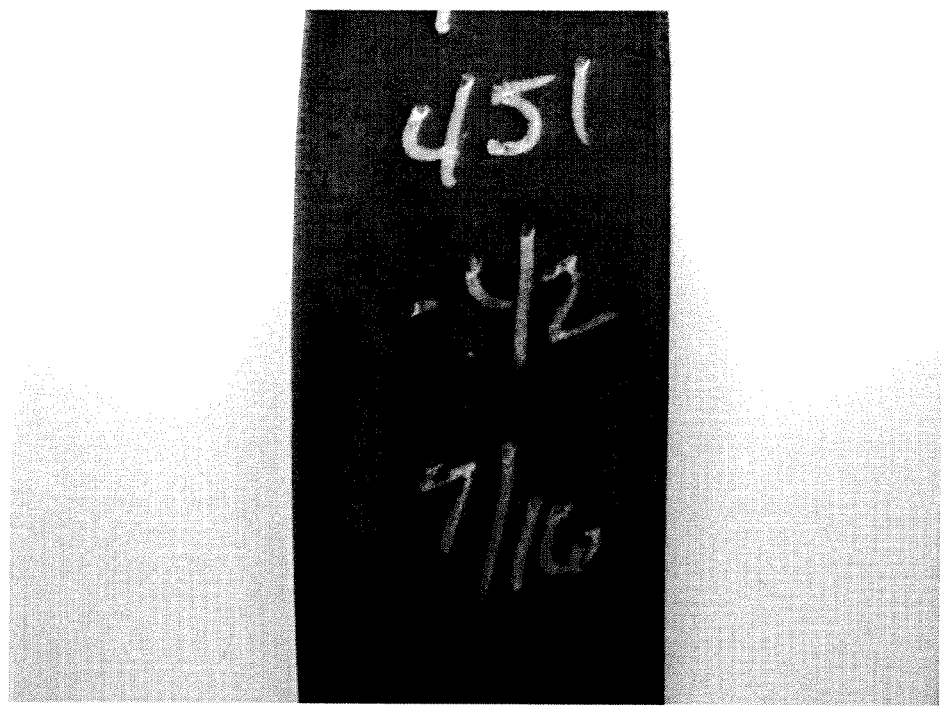
FIG. 4 is a photo of the surface of a prior art sponge rubber material.
Figure 5:
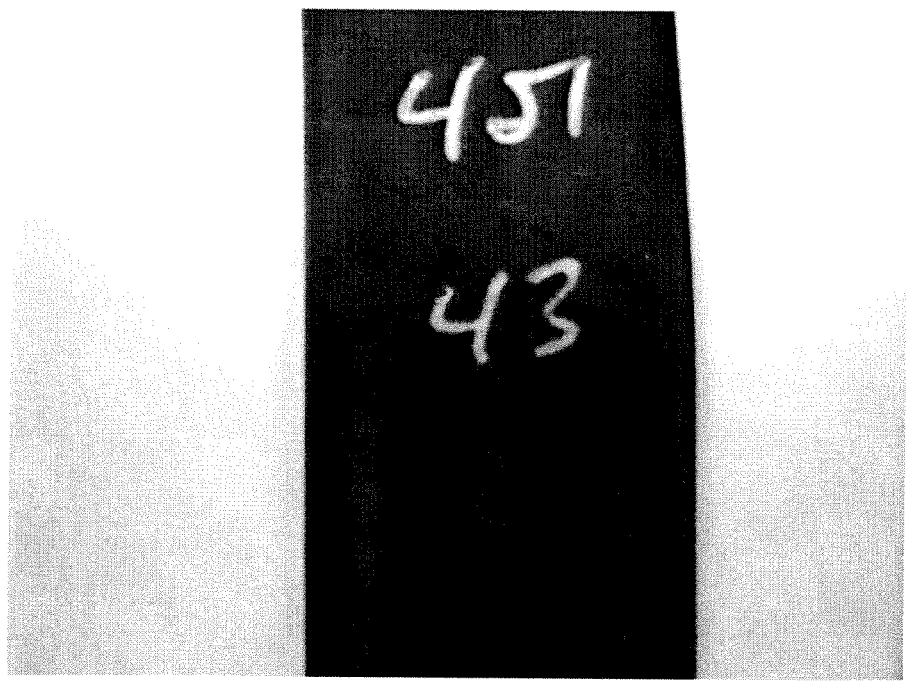
FIG. 5 is a photo of the surface of a sponge rubber material in accord with an embodiment of the invention.
Figure 6:
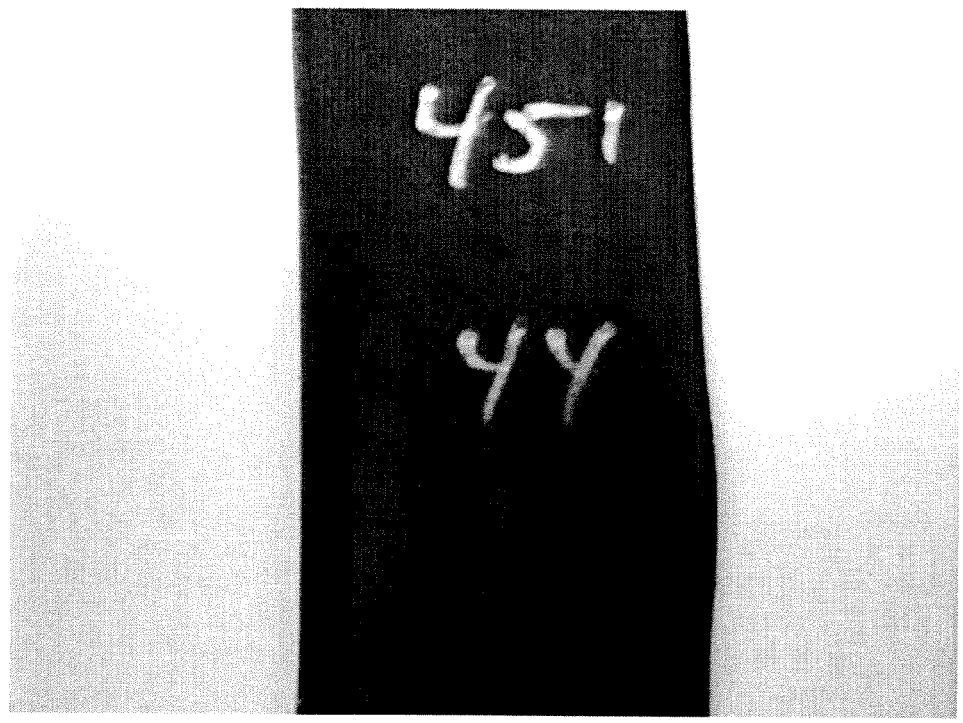
FIG. 6 is a photo of the surface of a sponge rubber material in accord with an embodiment of the invention.
Figure 7:
FIG. 7 is a photo of the surface of a sponge rubber material in accord with an embodiment of the invention.
Figure 8:
FIG. 8 is a photomicrograph of a cross section of a prior art sponge rubber material having a larger pore diameter.
Figure 9:
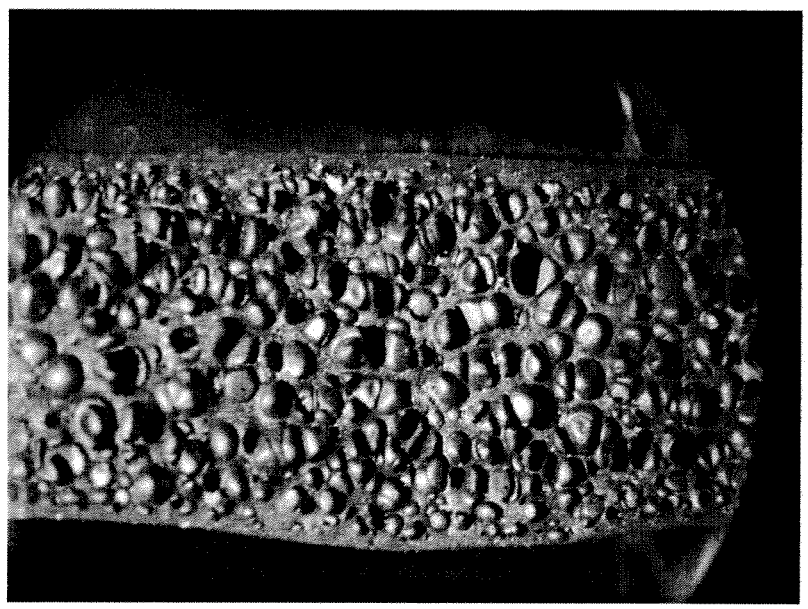
FIG. 9 is a photomicrograph of a cross section of a prior art sponge rubber material having a larger pore diameter.
Figure 10:
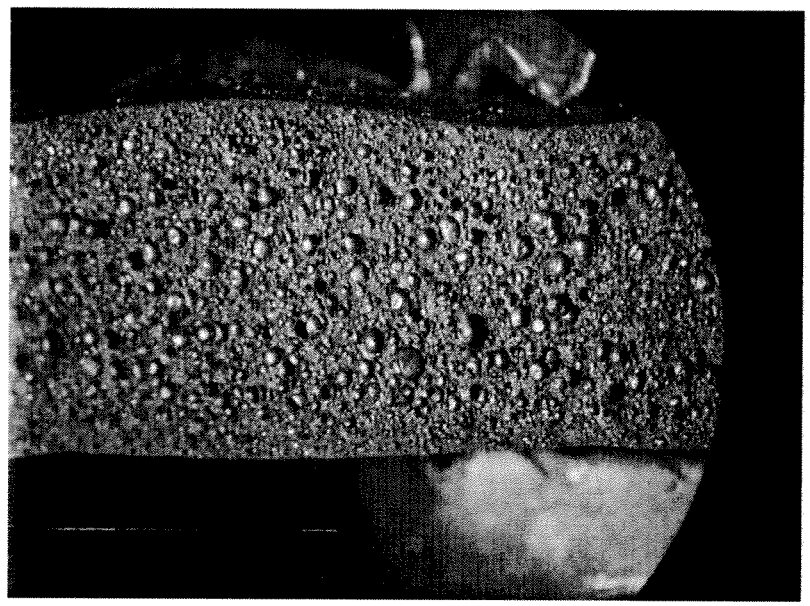
FIG. 10 is a photomicrograph of a cross section of a sponge rubber material having a smaller, uniform pore diameter, in accord with an embodiment of the invention.
Figure 11:
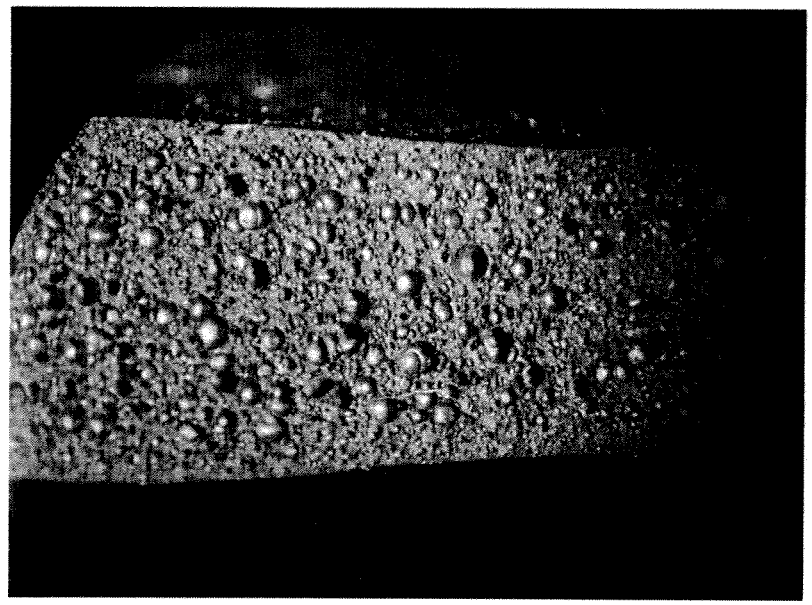
FIG. 11 is a photomicrograph of a cross section of a sponge rubber material having a smaller, uniform pore diameter, in accord with an embodiment of the invention.
Figure 12:
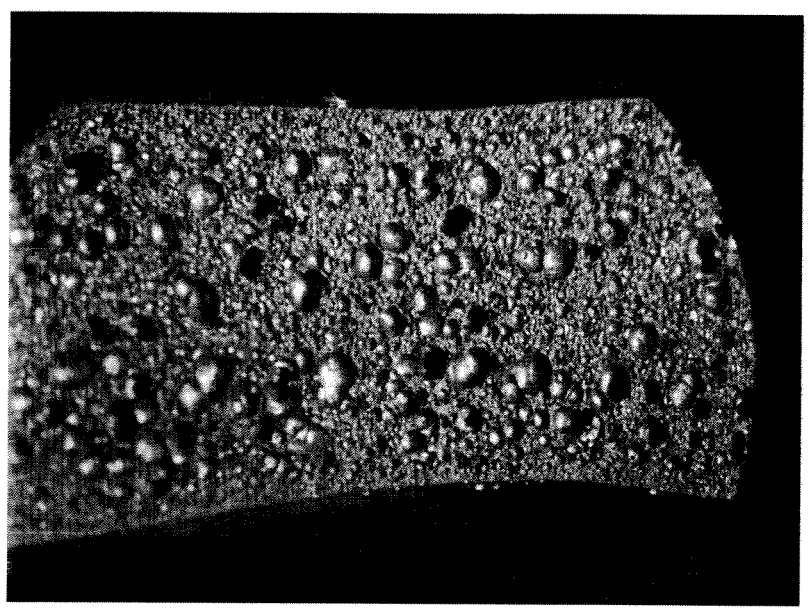
FIG. 12 is a photomicrograph of a cross section of a sponge rubber material having a smaller, uniform pore diameter, in accord with an embodiment of the invention.

With reference to Table 3, there are also provided additional sponge bulb material formulations. Formulation C is comparable to Formulation A, containing no physical blowing agent, and exhibited a blown specific gravity of 0.552 g/cc. Though the blown specific gravity is below 0.6 g/cc, the surface quality, as seen in FIGS. 3 and 8 of a finished weatherstrip comprising Formulation C and a cross-section thereof, respectively, is lesser than that of, for example FIGS. 5-7 and 10-12, corresponding to Formulations E-G. Formulation D, corresponding to FIGS. 4 and 9, exhibited a blown specific gravity of 0.439, which is lower than Formulation C, but again the surface quality is lacking. This Formulation D included only chemical blowing agents. Formulations E-G each included physical blowing agent, and exhibited blown specific gravities of 0.549, 0.544 and 0.358, respectively. With reference to FIGS. 5 and 10 (Formulation E), FIGS. 6 and 11 (Formulation F) and FIGS. 7 and 12 (Formulation G), it is seen that the inclusion of the physical blowing agent results in reduced blown specific gravity as well as enhanced surface quality. These Formulations, C-G, would be expected to perform in keeping with the results shown for Formulations A-B. For example, A, C and D would exhibit comparable performance, while B and E-G would exhibit comparable performance.

The invention has been described with reference to the certain embodiments thereof. Modifications and alterations will occur to others upon reading and understanding this specification. The foregoing is intended to include all such modifications and alterations, in so far as they come within the scope of the appended claims or the equivalents thereof.

The invention claimed is:

1. An automotive weatherstrip comprising a dense main body member and a less dense sponge bulb member, wherein the sponge bulb member comprises:
    an inner pore structure comprising open pores having a cross-sectional diameter of up to about 110 μm, and
    a smooth exterior surface finish;
    wherein the sponge bulb member has a blown specific gravity of less than or equal to about 0.40 g/cc;
    wherein the sponge bulb member does not comprise thermoplastic vulcanizates;
    wherein the sponge bulb member comprises an ethylene propylene diene terpolymer (EPDM);
    wherein the EPDM of the sponge bulb member is a thermoset material; and
    wherein the main body member comprises a thermoset EPDM.

2. The automotive weatherstrip of claim 1 wherein the sponge bulb portion is formed from a composition comprising the thermoset EPDM and a thermoexpandable microsphere physical blowing agent.

3. The automotive weatherstrip of claim 2 wherein the thermoexpandable microsphere blowing agent is included as about 40% to about 100% of the total blowing agent.

4. The automotive weatherstrip of claim 2 wherein the thermoexpandable microsphere blowing agent comprises microspheres having an acrylonitrile shell and a hydrocarbon fill.

5. The automotive weatherstrip of claim 4 wherein at process temperatures of about 80°-205° C. the shell ruptures and releases the hydrocarbon fill which has volatilized, rendering a substantially uniform microcellular structure within the sponge bulb member wherein the pores exhibit a cross-sectional diameter of about 100 μm.

6. The weatherstrip of claim 2, wherein the thermoexpandable microsphere physical blowing agent has an average particle diameter of from about 5 μm to about 50 μm.

7. The weatherstrip of claim 2, wherein the thermoexpandable microsphere physical blowing agent has an average particle diameter of from about 8 μm to about 16 μm.

8. The weatherstrip of claim 1 wherein the pores are substantially spherical.

9. The weatherstrip of claim 1, wherein the blown specific gravity is less than or equal to 0.358 g/cc.

10. The weatherstrip of claim 1, wherein the sponge bulb member has a compression load deflection of from 0.1833 N/mm² to 0.2120 N/mm².

11. An automotive weatherstrip comprising:
    a dense main body member including a mounting member that secures the body member to a first surface of abutting, first and second surfaces of an associated vehicle; and
    a sponge bulb member extending from the body member and dimensioned to selectively engage the second surface of the associated vehicle, wherein the sponge bulb member is less dense than the main body member, and comprises:
  an inner pore structure comprising open pores having a cross-sectional diameter of up to about 110 μm, and a smooth exterior surface finish;
wherein the sponge bulb member has a blown specific gravity of less than or equal to 0.40 g/cc;
wherein the sponge bulb member does not comprise thermoplastic vulcanizates;
wherein the sponge bulb member comprises an ethylene propylene diene terpolymer (EPDM);
wherein the EPDM of the sponge bulb member is a thermoset material; and
wherein the main hod member comprises a thermoset EPDM.

12. The weatherstrip of claim 11 wherein the sponge bulb member has a substantially uniform microcellular structure within the sponge bulb member wherein the pores exhibit a cross-sectional diameter of about 100 μm.

13. The weatherstrip of claim 11 wherein the pores are substantially spherical.

14. The weatherstrip of claim 11 wherein the main body member comprises at least in part a thermoplastic component.

15. The weatherstrip of claim 11 wherein the sponge bulb member has a Shore A hardness of at least 42, +/−2.

16. The weatherstrip of claim 11 wherein the sponge bulb member has a percent water absorption of approximately 8%.

* * * * *